United States Patent Office 3,634,315
Patented Jan. 11, 1972

3,634,315
POLYETHYLENE OXIDE STABILIZED WITH MERCAPTO-IMIDAZOLES
Kenichi Hattori, Yuichi Ueda, and Yukio Tanino, Wakayama-shi, Japan, assignors to Kao Soap Co., Ltd., Chuo-ku, Tokyo, Japan
No Drawing. Filed Sept. 30, 1969, Ser. No. 862,510
Claims priority, application Japan, Oct. 3, 1968, 43/72,119
Int. Cl. C08g 51/60
U.S. Cl. 260—45.8 N
6 Claims

ABSTRACT OF THE DISCLOSURE

An ethylene oxide polymer composition having an intrinsic viscosity of more than 0.03 and containing 0.5 to 15% by weight of a 2-mercaptoimidazole as a stabilizer.

This invention relates to a stabilized ethylene oxide polymer composition.

The ethylene oxide polymer is a class of water-soluble high molecular compounds useful as thickening agent, flocculating agent, dispersing agent, textile-sizing agent, wrapping film, sizing agent or binding agent, etc.

However, this type of high polymeric compound has disadvantages that it is unstable and liable to decompose slowly on standing or heating in the solid state or when stored in solutions. Such deterioration causes a lowering of the degree of polymerization and loss of the various characteristic properties of the said high molecular compound.

We have investigated the stabilization of the said high polymer of ethylene oxide and found that the incorporation of a heterocyclic compound which has a five-membered heterocyclic ring containing two nitrogen atoms as described below will stabilize the said ethylene oxide polymer.

The preferred examples of the above heterocyclic five-membered compounds which can be effectively used in the present invention can be represented by the following generic formulae.

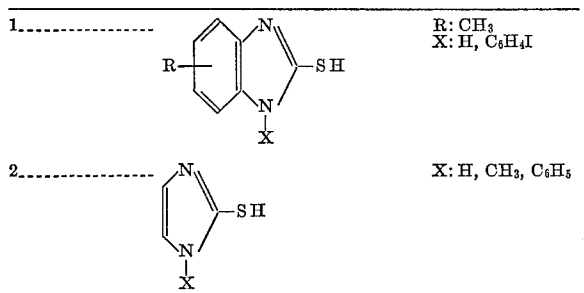

Examples of the respective compounds represented by those generic formulas which can be advantageously used in the composition of the present invention are as follows:

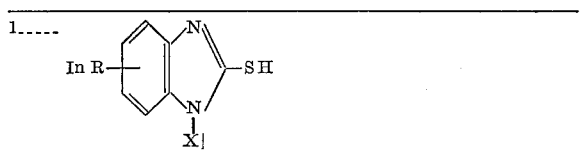

1-4... R=CH$_3$, X=H, M=H

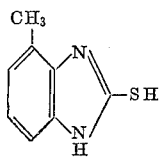

[IV]

4-methyl-2-mercaptobenzimidazole, melting point: 326° C., alcohol soluble.

1-5... R=CH$_3$, X=H, M=H

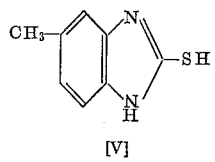

[V]

5-methyl-2-mercaptobenzimidazole, melting point: 285° C., soluble in alcohol, chloroform and water.

1-6... R=CH$_3$, X=C$_6$H$_4$I, M=H

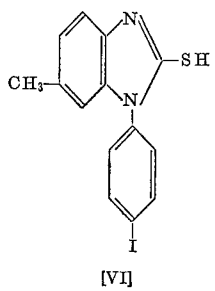

[VI]

1-(4-iodophenyl)-2-mercapto-6-methylbenzimidazole, melting point: 284–285° C., soluble in alcohol and chloroform.

3----- In

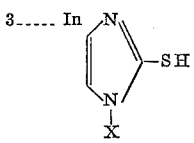

3-1... X=H

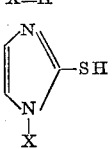

[IX]

2-mercaptoimidazole, melting point: 222° C., soluble in alcohol and water.

3-2... X=CH$_3$

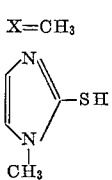

[X]

1-methyl-2-mercaptoimidazole, melting point: 141-2° C.; boiling point: ca. 280° C., soluble in water, alcohol and chloroform.

3-3... X=C$_6$H$_5$

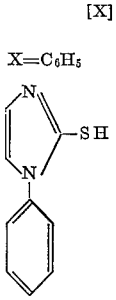

[XI]

1-phenyl-2-mercaptoimidazole, melting point: 181° C., soluble in alcohol and hot water.

On stabilizing an ethylene oxide polymer employing these stabilizer compounds, either of the following methods may be adopted; i.e., addition of the stabilizer to the solution of an ethylene oxide polymer dissolved in a solvent such as water, benzene, acetone and chloroform in which the polymer is soluble; addition of the stabilizer to the polymer dispersed in a solvent such as ether and hexane wherein the polymer is insoluble, followed by subsequent removal of the solvent; direct blending of the stabilizer with the polymer.

By addition of more than 0.5% by weight, preferably 2–10% by weight of a stabilizer according to the present invention to an ethylene oxide polymer, a marked improvement in the stability of the obtained ethylene oxide polymer composition can be achieved. Addition or more than 15% by weight of the stabilizer is undesirable because of its unpleasant odor.

The ethylene oxide polymers which will be stabilized according to the present invention are generally such high polymers as having intrinsic viscosities of more than 0.03 (35° C., water). These polymers can be obtained by polymerizing ethylene oxide by any conventional method in the presence of a catalyst such as acids, alkalis, chlorides of aluminum, zinc and iron, alkaline earth metal salts such as silicates and carbonates, and organic metal compounds (for example, triethylaluminum). In order to obtain a polymer having an intrinsic viscosity of more than 1.0, a suspension polymerization process by using a solid catalyst, particularly an alkaline earth metal salt such as calcium silicate catalyst, and a polymerization process by blowing ethylene oxide in the presence of an active catalyst containing an organic metal compound are particularly effective.

Ethylene oxide polymers are solid at a room temperature if their intrinsic viscosities exceed about 0.03. These solid polymers tend to decompose to polymers having smaller molecular weights. Such tendency of decomposition will increase with the increase of molecular weight of the polymer, duration of ageing and increase of temperature, regardless of the kinds of polymerization reaction and catalyst.

The ethylene oxide polymers having intrinsic viscosities of more than 1.0 are very useful in various fields of industry and are also liable to decompose. Accordingly, the stabilizer according to the present invention is preferably used with an ethylene oxide polymer having an intrinsic viscosity of more than 1.0.

Thus, by utilizing a stabilizer provided by the present invention, an excellent thermal stability and resistance to oxidation of ethylene oxide polymers can be accomplished, which have not been obtained by conventional stabilizers, such as 2,6-di-t-butyl-p-cresol.

The invention will be described with reference to the examples hereinbelow.

EXAMPLE 1

A high polymer of ethylene oxide was synthesized with calcium silicate as the catalyst and used as the sample for the test of stability.

The intrinsic viscosity of the polymer in water at 35° C. immediately after the dissolution was 9.8, corresponding to a molecular weight of approximately two millions. An aqueous 0.5% solution of the said polymer was prepared and aliquots of each 50 ml. were taken in conical flasks with stoppers, added with 5 mg. of the stabilizers indicated in Table 1 respectively. The viscosity of each test solution shaked at 40° C. for three days was determined, and the percentage of decomposition, calculated from the percentage of lowering in the viscosity. The results are shown in Table 1, the result obtained by using 2,6-di-t-butyl-p-cresol, as a known antioxidant is also listed in the table for comparison.

TABLE 1

| Stabilizer, name | Percent decomposition |
|---|---|
| 1-(4-iodophenyl)-2-mercapto-6-methylbenzimidazole | 10 |
| 5-methyl-2-mercaptobenzimidazole | 12 |
| 2-mercaptoimidazole | 15 |
| 1-phenyl-2-mercaptoimidazole | 23 |
| 2,6-di-t-butyl-p-cresol | 36 |
| Non-addition (control) | 61 |

EXAMPLE 2

Powders of the ethylene oxide polymer as used in Example 1 (5 g.) were dispersed in 200 ml. of diethyl ether, to which was added 0.1 g. of 4-methyl-2-mercaptobenzimidazole. The solvent was removed by distillation and the resulting solid composition comprising a mixture of the polymer and the incorporated stabilizer was allowed to stand for one month at room temperature exposed to the air. The results on the percentage of decomposition determined according to the percentage of lowering in the viscosity in an aqueous solution at 35° C. was 9%. A control with no stabilizer exhibits 87% decomposition.

EXAMPLE 3

Powdered ethylene oxide polymer (12 g.) as used in Example 1 and the stabilizer 0.24 g. of 1-methyl-2-mercaptoimidazole directly blended, melted into a film, and allowed to stand for one month at room temperatures after being cooled. The results on the percentage of decomposition determined according to the percentage of lowering in the viscosity in an aqueous solution at 35° C. was 23%, while a control with no stabilizer exhibited 97% decomposition.

We claim:
1. An ethylene oxide polymer composition wherein the ethylene oxide polymer has an intrinsic viscosity of more than 0.03, comprising 0.5% to 15% by weight of a compound having a five membered ring containing two nitrogen atoms and selected from the group consisting of

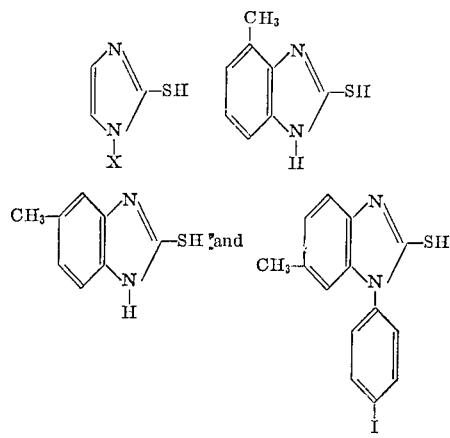

where X=H, $CH_3$, $C_6H_5$.

2. A composition according to claim 1 wherein the stabilizer is 5-methyl-2-mercaptobenzimidazole.
3. A composition according to claim 1 wherein the stabilizer is 2-mercaptoimidazole.
4. A composition according to claim 1 wherein the stabilizer is 1-phenyl-2-mercaptoimidazole.
5. A composition according to claim 1 wherein the stabilizer is 4-methyl-2-mercaptobenzimidazole.
6. A composition according to claim 1 wherein the stabilizer is 1-methyl-2-mercaptoimidazole.

(References on following page)

References Cited

UNITED STATES PATENTS

| | | | |
|---|---|---|---|
| 2,848,437 | 8/1958 | Langsdorf, Jr. et al. | 260—67 |
| 3,193,520 | 7/1965 | Caldo | 260—45.8 |
| 3,228,888 | 1/1966 | Spivack et al. | 252—402 |
| 3,360,499 | 12/1967 | Mauz et al. | 260—45.8 |
| 3,370,035 | 2/1968 | Ogura et al. | 260—45.75 |
| 3,379,875 | 4/1968 | Holoch | 260—45.8 |
| 3,388,095 | 6/1968 | Huntjens | 260—45.8 |

FOREIGN PATENTS 949,992   2/1964   Great Britain.

DONALD E. CZAJA, Primary Examiner

R. A. WHITE, Assistant Examiner

U.S. Cl. X.R.

260—45.95, 611.5